Nov. 27, 1951 — T. S. GATES — 2,576,506
CLAMPING DEVICE
Filed Jan. 19, 1948
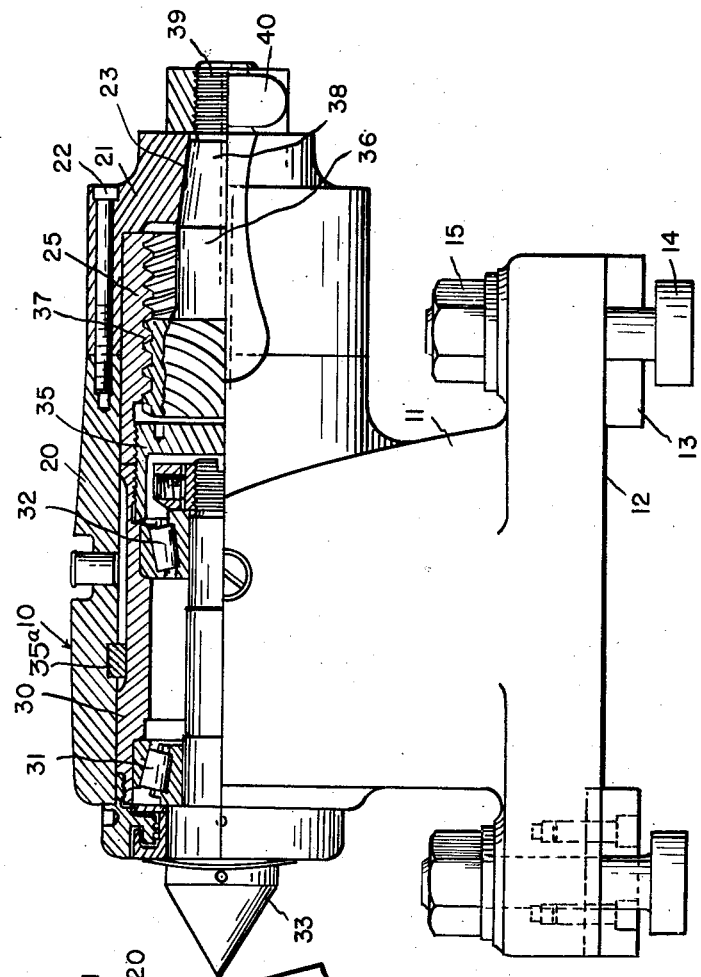
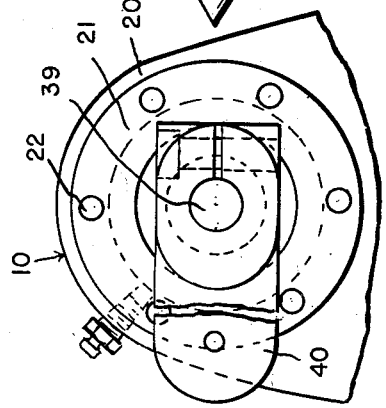
INVENTOR.
THOMAS S. GATES
BY Whittemore, Hulbert
& Belknap
ATTORNEYS Patented Nov. 27, 1951

2,576,506

UNITED STATES PATENT OFFICE 2,576,506

CLAMPING DEVICE

Thomas S. Gates, Grosse Pointe Woods, Mich., assignor to National Broach & Machine Company, Detroit, Mich., a corporation of Michigan Application January 19, 1948, Serial No. 3,002

9 Claims. (Cl. 82—31)

The present invention relates to a clamping device and more particularly to a clamping device effective to move a clamping element to clamping position and to lock said clamping element in clamping position upon movement of an operating handle in a single continuous motion.

It is an object of the present invention to provide a clamping device including a work engaging element and means to effect advance, establishment of pressure contact, and clamping of said work engaging element by movement of a handle in a single continuous direction.

More specifically, it is an object of the present invention to provide a clamping device, such for example as a tailstock, in which a work engaging element is advanced by an actuating element having a conical portion seated in a conical seat, the actuating element having means effective upon rotation thereof to effect advance of the work engaging element axially of the conical seat.

It is a further object of the present invention to provide a tailstock having means effective upon simple swinging movement of an operating handle in one direction to advance a work engaging element into strong pressure contact with a work piece and to retain the work engaging element in its advanced position, the work engaging element being easily retracted by reverse movement of the operating handle.

Other objects and features of the invention will become apparent as the description proceeds, especially when taken in conjunction with the accompanying drawings, wherein:

Figure 1 is a side elevation of the improved clamping device with parts broken away; and Figures 2 is a fragmentary end elevation of the device.

Referring now to the figures, a clamping device in the form of a tailstock having a rotatable center has been chosen for purposes of illustration. It will be appreciated, however, that the principles of the present invention may be embodied in other and widely different types of clamping devices.

The tailstock comprises a main casting 10 including a pedestal 11 and a supporting plate 12 adapted to be secured upon a machine tool by suitable means, such for example as keys 13, headed bolts 14 and clamping nuts 15. The upper portion of the casting 10 is in the form of an elongated, generally cylindrical housing 20 which is open at both ends. The rear end of the housing 20 is closed by a cap member 21 bolted or otherwise secured to the casting as indicated at 22. The cap member 21 is provided with an opening 23 therethrough which is of frusto-conical shape and which is adapted to serve as a conical seat.

Mounted for longitudinal sliding movement in the cylindrical housing 20 is an assembly including an internally threaded nut element 25. In order to effect rapid advance of the work engaging element, the threads formed internally on the nut element 25 are preferably of high lead and in a practical embodiment of the invention threads have been provided having a lead of over 2½ inches.

Forwardly of the nut element 25 is a bearing supporting sleeve 30 shaped to receive bearings 31 and 32 which support a work engaging element or center 33.

Intermediate the nut 25 and the sleeve 30 is a cup-shaped coupling member 35 which is externally threaded and to which the adjacent ends of the nut 25 and sleeve 30 are threaded, preferably so as to bring the ends of these parts into abutting engagement. If desired, additional means may be provided for effecting a positive interconnection between the nut 25 and the sleeve 30.

Means are provided for preventing rotation of the assembly which may take the form of a conventional key 35a while at the same time permitting free movement of the assembly in a direction parallel to the axis of the conical seat 23.

Received within the housing 20 and extending outwardly through the opening provided by the conical seat 23 is an actuator 36 having at its forward end a threaded portion 37 engaging the internal threads of the nut 25. The portion 38 of the actuator 36 which is received within the conical seat 23 is conically shaped to cooperate therewith. A portion 39 of the actuator 36 extends outwardly through the opening in the conical seat and receives an operating handle 40 which also serves as a stop to limit axial movement of the actuator.

The actuating element 36 is mounted for slight movement in the housing 20 in a direction parallel to the axis of the conical seat 23, the amount of such movement being very small but nevertheless sufficient to permit a frictional interlock between the conical portion 38 and the conical seat 23 in one limiting position and substantial freedom for relative rotation between these parts in the other limiting position. It will be observed that the left-hand end of the actuator as seen in Figure 1 is spaced from the adjacent portion of the coupling 35.

The threads of the threaded portion 37 of the actuator are herein illustrated as left-hand threads and accordingly a clockwise rotation of the actuator 36 as viewed from the rear of the tailstock will result in advance of the center assembly to the left as seen in this figure. So long as this motion is substantially unopposed, friction between the conical portion 38 of the actuator and the conical seat 23 is negligible, although these conical surfaces will remain in light contact. However, as soon as the center 33 engages a work piece the reaction of the pressure between the center and the work piece is taken up by the conical surfaces, resulting in a firm interlock. By appropriately selecting the cone angle of the seat 23 of the conical portion 38 the force which may be exerted by the center 33 upon the work piece before a frictional lock is established between the conical surfaces may be predetermined. It is found that a relatively small cone angle may be employed and as illustrated herein the straight line elements of the cone make a relatively small angle with respect to its axis.

While relatively great clamping pressure may be established by this device and while it effectively holds the center in full pressure contact with the work piece against forces acting on the center, a relatively small force applied to the handle 40 is required to release the work piece.

Attention is directed to the fact that the movable elements of the device are all designed so that no backlash is present in the device when the center engages a work piece. At this time the conical portion 38 of the actuator 36 will be in light pressure contact with the conical seat 23. At the same time, the forward (or left-hand as seen in Figure 1) sides of the teeth of the actuator are engaged with the rear (or right-hand sides as viewed in this figure) of the teeth of the nut 25. The parts are therefore in position to take up loads without appreciable relative movement after the center has engaged the work piece, and accordingly a minimum rotation of the handle 40 is thereafter effective to apply clamping pressure to the work piece.

The drawing and the foregoing specification constitute a description of the improved clamping device in such full, clear, concise and exact terms as to enable any person skilled in the art to practice the invention, the scope of which is indicated by the appended claims.

What I claim as my invention is:

1. A work holding device comprising a housing having a longitudinal opening therethrough, the opening at the rear of said housing being of frusto-conical shape to provide a conical seat the larger end of said seat facing forwardly of said housing; a work engaging member slidable longitudinally in said housing and having a work engaging portion extending outwardly beyond the front end of said housing and a threaded portion within said housing at the opposite end from said work engaging portion, and means preventing rotation of said threaded portion in said housing; an actuator for said work engaging member having a threaded portion in said housing engaged with the threaded portion of said work engaging member, a male conical portion in said housing located in said conical seat and shaped to fit in surface-to-surface contact therein, a stop element on said actuator located outside said housing and restricting longitudinal movement of said actuator forwardly of said housing, and an operating handle carried by said actuator beyond the end of said housing for rotating said actuator.

2. A device as defined in claim 1 in which the threaded portion of said work engaging member is internally threaded and the threaded portion of said actuator is externally threaded.

3. A device as defined in claim 1 in which the stop element and the conical surface of said actuator are spaced apart a distance such as to limit axial movement of said actuator to an amount only sufficient to free said actuator for rotation when advance of said work engaging member is substantially unopposed.

4. A device as defined in claim 1 in which the axes of said threaded portions and the axes of the conical portions are in alignment.

5. A clamping device comprising a support having a female conical seat therein, a clamping element carried by said support for movement axially toward and away from the larger end of said seat, means intermediate said support and element to prevent rotation of said element, a rotary actuating element carried by said support including a male conical portion within said conical seat shaped to fit in surface-to-surface contact therein, stop means on said actuating element to limit movement of said conical portion outwardly of said conical seat to an amount sufficient to free said conical portion for rotation in said conical seat, drive means intermediate said actuating element and clamping element to move said clamping element axially of said conical parts upon rotation of said actuating element.

6. A tailstock comprising a housing having a female conical seat at its rear end, the larger end of said seat facing forwardly of said housing, a center support movable in said housing axially of said seat, a center carried by said support extending beyond the front end of said housing, said support including a threaded portion movable therewith in said housing axially of said seat, means in said housing to prevent rotation of said threaded portion, a rotatable actuator in said housing including a threaded portion engaged with the threaded portion of said support and a male conical portion in said seat shaped to fit in surface-to-surface contact therein, means on said actuator to limit movement of its conical portion outwardly of said seat to an amount only substantially sufficient to free said actuator for rotation.

7. A tailstock comprising a housing having a female conical seat at its rear end, the larger end of said seat facing forwardly of said housing, a center support movable in said housing axially of said seat, a live center carried by said support extending beyond the front end of said housing, said support including a threaded portion movable therewith in said housing axially of said seat, a coupler connecting said threaded portion to said support comprising a transverse wall separating said live center from said threaded portion, means in said housing to prevent rotation of said threaded portion, a rotatable actuator in said housing including a threaded portion engaged with the threaded portion of said support and a male conical portion in said seat shaped to fit in surface-to-surface contact therein, means on said actuator to limit movement of its conical portion outwardly of said seat to an amount only substantially sufficient to free said actuator for rotation.

8. In a tailstock comprising a housing, a work-engaging center projecting beyond its front end and a center support slidable in said housing longitudinally of said center: said housing having a conical opening defining a seat at its rear end coaxial with said center, the larger end of said opening facing forwardly of said housing, an actuator comprising a conical portion in said opening shaped to fit in surface-to-surface contact therewith, and a portion extending rearwardly of said opening, stop means on the rearwardly extending portion of said actuator engageable with the rear end of said housing to restrict forward axial motion of said actuator to an amount only sufficient to free said conical portion for rotations in said conical opening, means in said housing to prevent rotation of said center support, cooperating threaded means on said center support and actuator, and means for rotating said actuator.

9. Structure as defined in claim 8 in which a handle on the rearwardly extending portion of said actuator constitutes said stop means and said means for rotating said actuator.

THOMAS S. GATES.

REFERENCES CITED

The following references are of record in the file of this patent:

UNITED STATES PATENTS

| Number | Name | Date |
|---|---|---|
| 2,247,562 | Santen | July 1, 1941 |
| 2,275,723 | Bregi | Mar. 10, 1942 |
| 2,456,252 | Bugatti | Dec. 14, 1948 |
| 2,502,512 | Demetriades | Apr. 4, 1950 |